(12) United States Patent
Seok (10) Patent No.: US 9,554,404 B2
(45) Date of Patent: *Jan. 24, 2017

(54) METHOD AND APPARATUS FOR TRANSMITTING FRAME IN WIRELESS LOCAL AREA NETWORK (WLAN) SYSTEM

(71) Applicant: LG ELECTRONICS INC., Seoul (KR)

(72) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,476

(22) Filed: Aug. 4, 2015

(65) Prior Publication Data

US 2015/0341966 A1  Nov. 26, 2015

Related U.S. Application Data

(63) Continuation of application No. 13/377,167, filed as application No. PCT/KR2010/003723 on Jun. 10, 2010, now Pat. No. 9,125,179.

(60) Provisional application No. 61/185,593, filed on Jun. 10, 2009.

(51) Int. Cl.
*H04W 76/02* (2009.01)
*H04W 84/12* (2009.01)
*H04W 84/04* (2009.01)

(52) U.S. Cl.
CPC .......... *H04W 76/02* (2013.01); *H04W 84/047* (2013.01); *H04W 84/12* (2013.01)

(58) Field of Classification Search
CPC ...................................... H04W 76/02–76/024
USPC ....................................................... 370/315
See application file for complete search history.

(56) References Cited

U.S. PATENT DOCUMENTS

| 7,961,693 | B2 | 6/2011 | Chu et al. |
| 8,099,470 | B2* | 1/2012 | Kodama ................. G06F 15/16 |
| | | | 709/212 |
| 8,400,955 | B2 | 3/2013 | Singh et al. |
| 9,338,660 | B2* | 5/2016 | Cheong ................. H04W 16/26 |
| 9,338,789 | B2* | 5/2016 | Wang ................... H04W 72/121 |
| 2006/0165035 | A1 | 7/2006 | Chandra et al. |
| 2006/0205340 | A1* | 9/2006 | Cho ..................... H04B 7/2606 |
| | | | 455/11.1 |
| 2006/0215601 | A1 | 9/2006 | Vleugels et al. |

(Continued)

FOREIGN PATENT DOCUMENTS

EP  1 998 499 A1  12/2008

OTHER PUBLICATIONS

"A method to implement Inter-system communication over air", IEEE C802.16h-07/027, Mar. 9, 2007.

*Primary Examiner* — Edan Orgad
*Assistant Examiner* — Emmanuel Maglo
(74) *Attorney, Agent, or Firm* — Birch, Stewart, Kolasch & Birch, LLP (57) ABSTRACT

A frame transmission method, for receiving data in a wireless local area network. A destination station establishes a direct link with a source station. The destination station receives a first physical layer protocol data unit (PPDU) from the source station via the direct link. The destination station receives a second PPDU from a relay station via a relay link. In addition, the second PPDU is received by the relay station from the source station and is forwarded by the relay station to the destination station. Furthermore, the first PPDU includes a sequence field indicating that the second PPDU is to be transmitted via the relay link.

6 Claims, 8 Drawing Sheets

(56) References Cited

U.S. PATENT DOCUMENTS

| | | |
|---|---|---|
| 2007/0058605 A1* | 3/2007 | Meylan .............. H04W 72/0406 370/346 |
| 2007/0076649 A1 | 4/2007 | Lin et al. |
| 2007/0226351 A1 | 9/2007 | Fischer et al. |
| 2007/0230423 A1 | 10/2007 | Yoshida et al. |
| 2008/0137585 A1 | 6/2008 | Loyola et al. |
| 2008/0285501 A1 | 11/2008 | Zhang et al. |
| 2008/0316954 A1* | 12/2008 | Zheng ................. H04B 7/2606 370/315 |
| 2008/0317017 A1* | 12/2008 | Wiemann ............. H04L 1/0002 370/389 |
| 2009/0003378 A1* | 1/2009 | Sachs ..................... H04L 1/16 370/466 |
| 2009/0116399 A1* | 5/2009 | Ho ......................... H04L 47/10 370/252 |
| 2009/0190490 A1* | 7/2009 | Finer .................. H04L 43/0852 370/252 |
| 2009/0268653 A1 | 10/2009 | Itagaki et al. |
| 2009/0279464 A1 | 11/2009 | Kakani et al. |
| 2009/0290528 A1 | 11/2009 | Kwon et al. |
| 2010/0008274 A1 | 1/2010 | Kneckt et al. |
| 2010/0039982 A1 | 2/2010 | Itagaki et al. |
| 2010/0046430 A1 | 2/2010 | Naito et al. |
| 2010/0120360 A1 | 5/2010 | Haustein et al. |
| 2010/0190433 A1 | 7/2010 | Zhang et al. |
| 2010/0254301 A1 | 10/2010 | Blankenship et al. |
| 2011/0110258 A1* | 5/2011 | Ishii ....................... H04B 7/155 370/252 |
| 2011/0194483 A1 | 8/2011 | Ji et al. |
| 2011/0228755 A1 | 9/2011 | Seok |
| 2012/0014335 A1 | 1/2012 | Adachi et al. |
| 2012/0051312 A1* | 3/2012 | Noh ..................... H04W 76/023 370/329 |
| 2012/0051350 A1 | 3/2012 | Kim et al. |
| 2012/0087356 A1 | 4/2012 | Wentink |
| 2012/0230316 A1 | 9/2012 | Seok |
| 2013/0142189 A1 | 6/2013 | Seok |
| 2013/0301553 A1* | 11/2013 | Klein .................... H04W 84/12 370/329 |

* cited by examiner

METHOD AND APPARATUS FOR TRANSMITTING FRAME IN WIRELESS LOCAL AREA NETWORK (WLAN) SYSTEM

CROSS-REFERENCE TO RELATED APPLICATIONS

This application is a continuation of co-pending U.S. patent application Ser. No. 13/377,167 filed on Dec. 9, 2011, which is the national phase of PCT International Application No. PCT/KR2010/003723 filed on Jun. 10, 2010, which claims the benefit of U.S. Provisional Application No. 61/185,593 filed on Jun. 10, 2009. The entire contents of all of the above applications are hereby incorporated by reference.

BACKGROUND OF THE INVENTION

Field of the Invention

The present invention relates to wireless communications, and more particularly, to a frame transmission method using a cooperative direct link setup (C-DLS) in a wireless local area network (WLAN) and an apparatus supporting the method.

Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WEAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of above 1 Gbps. This is because the IEEE 802.11n MAC/PRY protocol is designed for an operation of a station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of above 1 Gbps in the wireless communication system, a new system different from the conventional IEEE 802.1 in MAC/PHY protocol (i.e., the single STA architecture) is required. A very high throughput (VHT) WLAN system is a next version of the IEEE 802.11n MAN system, and is one of IEEE 802.11 WLAN systems which have recently been proposed to support a data processing rate of above 1 Gbps in a MAC service access point (SAP).

The VHT WLAN system allows simultaneous channel access of a plurality of VHT STAs for the effective use of a radio channel. For this, a multi-user multiple input multiple output (MU-MIMO)-based transmission using multiple antennas is supported. The VHT AP can perform spatial division multiple access (SDMA) transmission for transmitting spatially multiplexed data to the plurality of VHT STAs.

In addition, there is ongoing research on a method of using a channel bandwidth of 80 MHz or higher in a VHT WLAN system. However, legacy stations such as IEEE 802.11a/b/g/n are widely used, and it is not easy to find a contiguous channel having an unused bandwidth above 80 MHz. Accordingly, there is a need to consider a channel access method and a frame transmission method with respect to a channel having a bandwidth above 80 MHz obtained by aggregating non-contiguous channels.

SUMMARY OF TILE INVENTION

The present invention provides a frame transmission method of a station operating in multiple channels to improve an overall throughput of a system by utilizing a space division multiple access (SDMA) scheme and a direct link setup (DLS) mechanism cooperative to frame transmission of an access point.

In an aspect of the present invention, a frame transmission method, performed by a station (STA), in a wireless local area network (LAN) system includes receiving a relay request message from an access point (AP), setting up a direct link (DL) with a destination STA indicated by the relay request message, transmitting a relay response message to the AP after setting up the DL, receiving a first data frame from the AP, and transmitting the first data frame to the destination STA through the DL.

The setting up of the DL may include transmitting a direct link setup (MS) request message to the destination STA, and receiving a DLS response message from the destination STA in response to the DLS request message.

The first data frame may be transmitted from the AP together with a second data frame transmitted for the destination STA by using space division multiple access (SDMA) transmission.

The first data frame may be transmitted in an aggregate MAC service data unit (A-MSDU) format.

The transmission of the first data frame through the DL may be carried out in a channel different from that used in transmission of the second data frame.

In another aspect of the present invention, A frame transmission method, performed by an access point (AP), in a wireless local area network (WLAN) includes transmitting a relay request message to a relay station (STA) to request receiving of a first data frame and then transmitting the received first data frame to a destination STA through a direct link (DL), receiving a relay response message in response to the relay request message, and transmitting the first data frame to the relay STA and the second data frame to the destination STA simultaneously by using space division multiple access (SDMA) transmission.

The relay STA may be selected by the AP by considering a channel correlation between the relay STA and the destination STA.

The first data frame may be transmitted in an aggregate MAC service data unit (A-MSDU) format.

Frame transmission is performed by using space division multiple access (SDMA) transmission of an access point (AP) together with direct link transmission performed by a relay station cooperative to frame transmission of the AP. As a result, spectrum efficiency increases, and thus an overall throughput of a wireless local area network (WLAN) system can increase.

DETAILED DESCRIPTION OF THE INVENTION

Hereinafter, embodiments of the present invention will be described with reference to the accompanying drawings.

Figure 1:
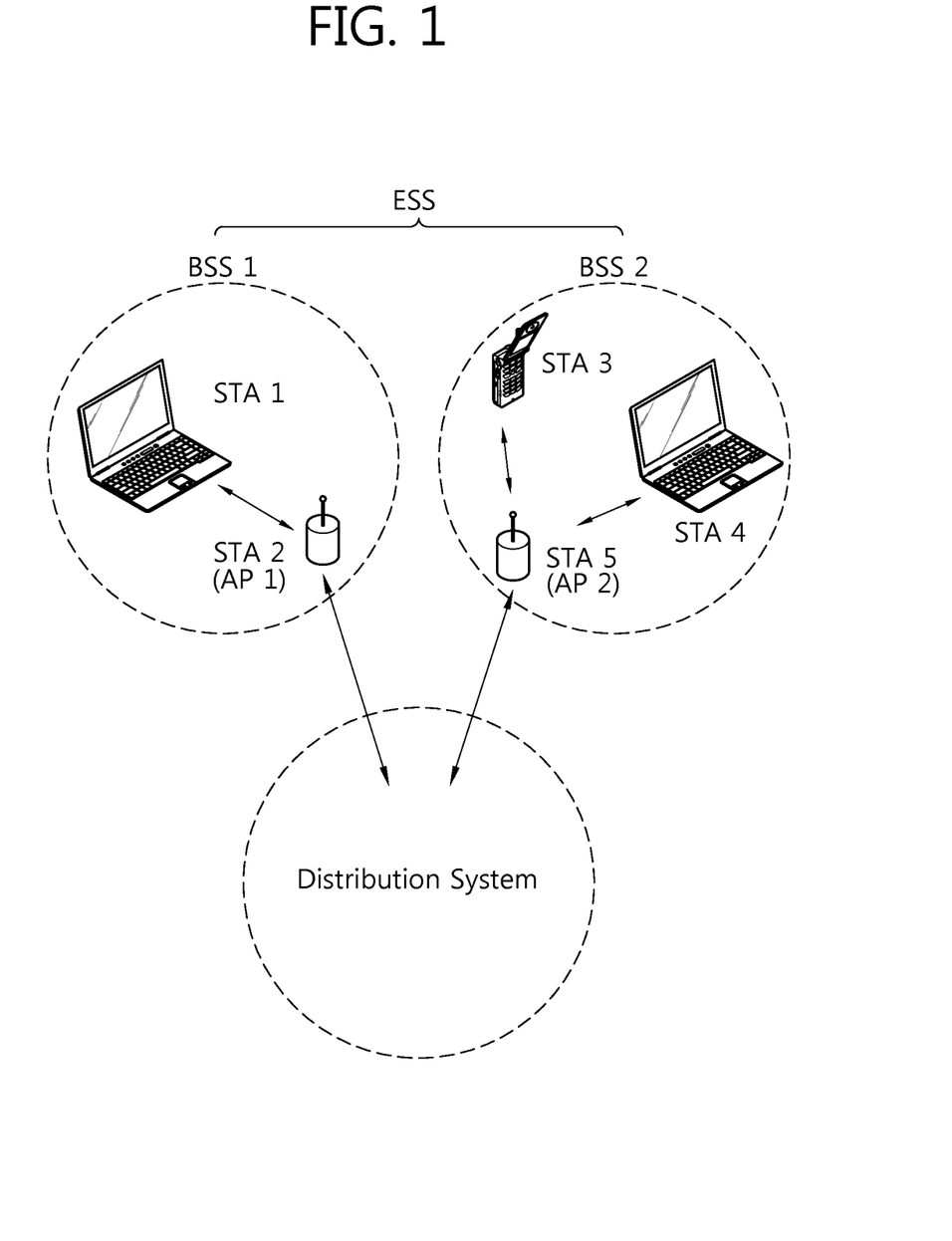
FIG. 1 is a schematic view showing an exemplary structure of a WLAN system to which an embodiment of the present invention can be applied.

FIG. 1 is a schematic view showing an exemplary structure of a WLAN system to which an embodiment of the present invention can be applied.

Referring to FIG. 1, the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS). The infrastructure 1355 is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports super high-rate data processing of above 1 GHz in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

Among the STAs, non-AP STAs (i.e., STA1, STA3, STA4, STA6, STA7, and STA8) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA (or simply a VHT STA) is defined as a non-AP STA that supports the super high-speed data processing of above 1 GHz in the multi-channel environment to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing of above 1 GHz in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

The present invention proposes a cooperative direct link setup (C-DLS) mechanism in which, when an AP transmits a plurality of frames to a destination STA, an STA cooperative to frame transmission of the AP receives some of the plurality of frames to be transmitted Co the destination STA and transmits the received frames through a direct link (DL).

Hereinafter, the C-DLS proposed in the present invention will be described by taking a case of using an 80 MHz channel consisting of two channels non-contiguous to each other for example. That is, the 80 MHz channel consists of a first contiguous channel having a channel bandwidth of 40 MHz and a second contiguous channel having a channel bandwidth of 40 MHz. In this case, the first channel and the second channel may be contiguous to each other. The bandwidth of each channel and the number of channels assumed herein are provided only for exemplary purposes only, and thus the technical features of the present invention are not limited thereto.

In the C-DLS method proposed in the present invention, DL transmission can be performed between STAs by using other channels not used by an AP. That is, when SDMA uplink/downlink transmission is performed between the AP and the STA in the first channel, DL transmission can be performed by setting up a DL between STAs not participating in SDMA uplink/downlink transmission in the second channel. A relay STA sets up a DL by acting as a DLS initiator in the second channel and transmits a frame, which is to be delivered to a DLS responder and is received from the AP, to the DLS responder through the DL of the second channel.

Figure 2:
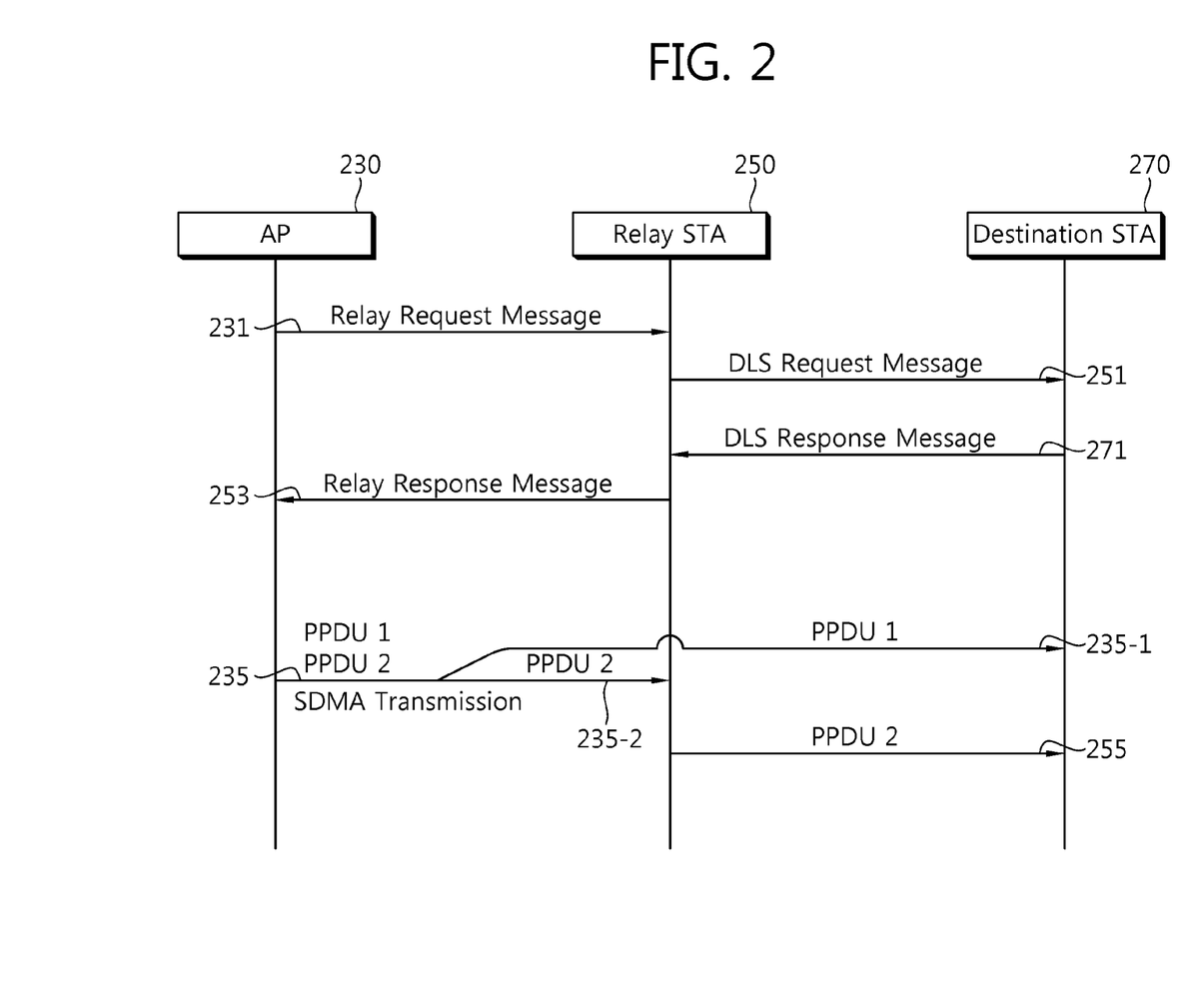
FIG. 2 is a flowchart showing a C-DLS setup process and a frame transmission process using C-DLS according to an embodiment of the present invention.

FIG. 2 is a flowchart showing a C-DLS setup process and a frame transmission process using C-DLS according to an embodiment of the present invention.

An AP 230 intends to transmit a PPDU 1 and a PPDU 2 to a destination STA 270. In this case, before transmission of the data frames PPDU 1 and PPDU 2, the AP 230 selects a relay STA 250 for relaying a data frame for the AP 230 itself and transmits a relay request message 231. The relay request message 231 may include identification information of the relay STA 250 and identification information of the destination STA 270. A detailed example of a format of the relay request message 231 will be described below with reference to FIG. 4.

Upon receiving the relay request message 231, the relay STA 250 transmits a DLS request message 251 for DL setup to the destination STA 270 indicated by the relay request message 231. Upon receiving the DLS request message 251, the destination STA 270 determines whether to accept a DL setup request, and transmits a DLS response message 271 to the relay STA 250.

In the DL setup between the relay STA 250 and the destination STA 270, the DLS request message 251 and the DLS response message 271 may be a DLS request frame and a DLS response frame, respectively, based on the IEEE 802.11 standard. For frame formats of the DLS request frame and the DLS response frame and a DL setup procedure, sections 7 and 11 of "IEEE Standard for Information technology—Telecommunications and information exchange between systems-Local and metropolitan area networks-Specific requirements, Part 11: Wireless LAN Medium Access Control (MAC) and Physical Layer (PHY) Specifications" introduced in June, 2007 may be incorporated herein by reference.

Upon receiving the DLS response message 271, the relay SIA 250 transmits a relay response message 253 to the AP 230 in response to the relay request message 231. The relay response message 253 may include a status code field for indicating whether to accept a relay request. A detailed frame format and a function thereof will be described below with reference to FIG. 5.

In the example of FIG. 2, if a value of a status code field of the relay response message 253 is 'accept', the AP 230 transmits a data frame 235 (i.e., PPDU 1 and PPDU 2) to the relay STA 250 and the destination STA 270. In this case, the data frame 235 (i.e., PPDU 1 and PPDU 2) may be transmitted using SDMA transmission. That is, the PPDU 1 is transmitted to the destination STA 270 (indicated by 235-1), and the PPDU 2 is transmitted to the relay STA 250 (indicated by 235-2).

The AP 230 may transmit the data frame transmitted to the relay STA 250 in an aggregate MAC service data unit (A-MSDU) format. In doing so, it can be known that a final destination of a frame received by the relay STA 250 is the destination STA 270, and the frame can be relayed to the destination STA 270. The A-MSDU frame format that can be used by the embodiment of the present invention will be described below in greater detail with respect to FIG. 6.

Thereafter, the relay STA 250 transmits the PPDU 2 to the destination STA 270 through the DL.

Although not shown in FIG. 2, all STAs in a BSS, including the relay 250 and the destination STA 270, can report the AP that they support the C-DLS proposed in the present invention. For this, the STA may transmit a frame to the AP by setting a C-DLS capability bit to '1'. The C-DLS capability bit indicates whether the C-DLS is supported, and is included in a VET capability information element. The vHT capability information element may be included in an association request frame or an association response frame based on the IEEE 802.11 standard.

The AP may obtain information regarding whether the STA supports the C-DLS in an association process, and can select a relay STA based on the obtained information. The relay STA may be selected by considering a channel correlation between the relay STA and the destination STA. This is because, when a data frame is transmitted by the AP to the relay STA and the destination STA by using the SDMA method, the lower the channel correlation between the relay STA and the destination STA, the higher the performance gain can be obtained.

Figure 3:
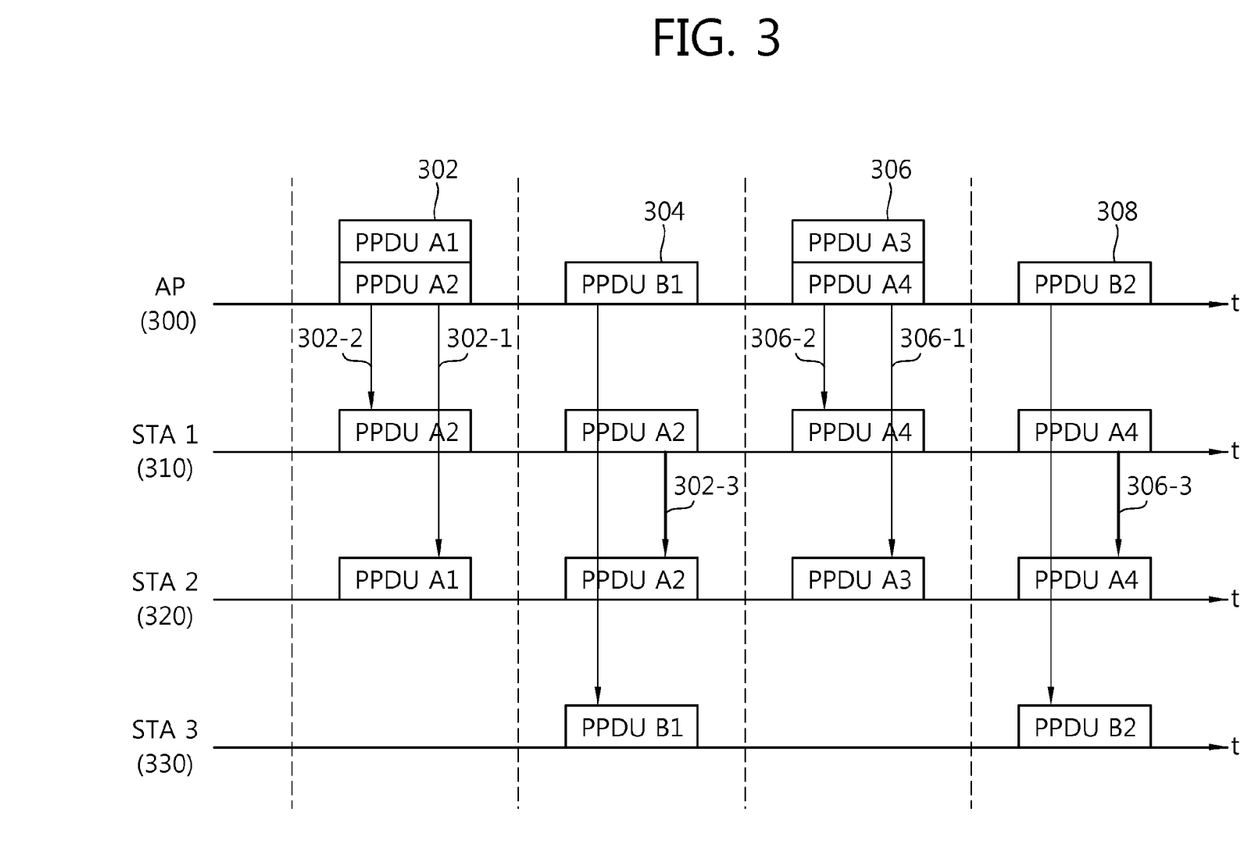
FIG. 3 shows an example of data frame transmission according to C-DLS proposed in the present invention.

FIG. 3 shows an example of data frame transmission according to C-DLS proposed in the present invention.

An AP 300 intends to transmit data frames PPDU A1 and PPDU A2 to an STA2 320. In general, the number of PHY interfaces of the AP is greater than that of the STA. In the example of FIG. 3, it is assumed that the AP 300 can perform data transmission/reception using 8 spatial streams with 8 PHY interfaces, and an STA1 310 and the STA2 320 can perform data transmission/reception using 4 spatial streams with 4 PHY interfaces. If the AP 300 intends to transmit an SDMA data frame 302 consisting of the PPDU A1 and the PPDU A2 to the STA2 320 by using the 8 spatial streams, the STA2 320 can use only 4 spatial streams due to restriction on available PHY interfaces or the like, and thus resource utilization of the AP 300 may decrease.

In data frame transmission using the C-DLS according to the present invention, the AP 300 transmits a relay request frame as shown in FIG. 2 to the STA1 310. The STA1 310 sets up a DL by performing a DL setup procedure with the STA2 320. The AP 300 transmits the PPDU A2 and the PPDU A1 respectively to the STA 310 and the STA2 320 by using SDMA transmission. The AP can transmit the SDMA data frame 302 to the STA1 310 and the STA2 320 by utilizing all available PHY interfaces, and can transmit a PPDU B1 304 to an STA3 330. While the AP transmits the PPDU B1 304 to the STA3 330, the STA1 310 can transmit the PPDU A2 to the STA2 320 through the DL (as indicated by 302-3). Transmission of the PPDU A2 of the STA1 310 through the DL may be performed in a channel different from a channel on which the AP transmits the PPDU B1 to the STA3 330. Further, the STA3 330 may be an STA not supporting C-DLS and co-existing in a BSS. That is, the AP 300 transmits the PPDU B1 304 and the STA1 310 transmits the PPDU A2 through different channels independently, and as a result, spectrum efficiency and AP's resource utilization can increase. A PPDU A3, a PPDU A4, and a PPDU B2 can also be transmitted afterwards in the same manner as described above.

Figure 4:
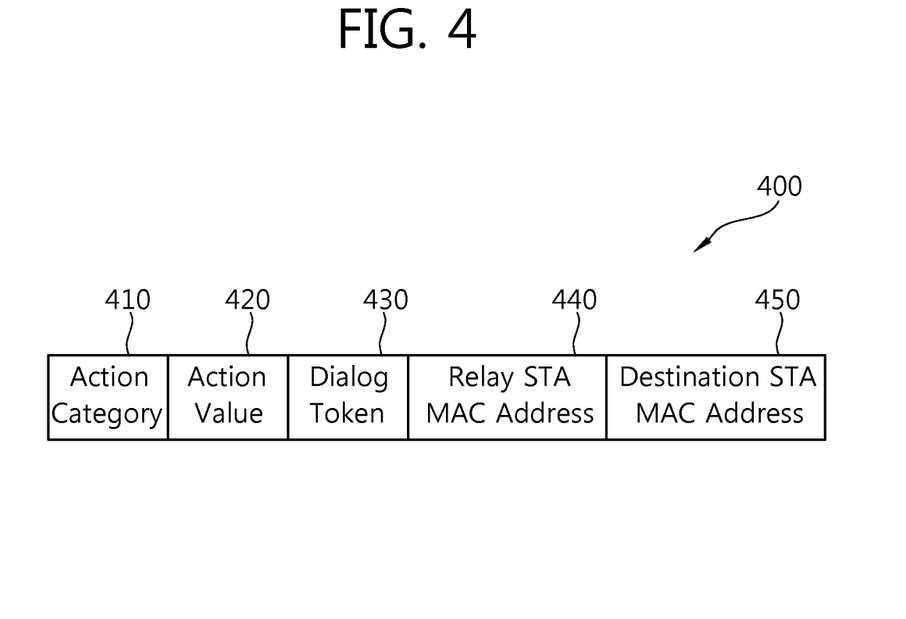
FIG. 4 is a diagram showing an exemplary format of a relay request message proposed in the present invention.

FIG. 4 is a diagram showing an exemplary format of a relay request message proposed in the present invention.

A relay request message 400 proposed in the present invention may be used when an AP requests a relay STA to relay some of frames to be transmitted to a destination STA. The relay request message 400 includes an action category field 410, an action value field 420, a dialog token field 430, a relay STA MAC address field 440, and a destination STA MAC address field 450.

The action category field 410 and the action value field 420 indicate a category of a specific frame and a brief description on its operation. That is, these frames may indicate that the specific frame is related to data frame relay and is a control signal for requesting the relay. The dialog token field may indicate identification information for mapping with a response message to be transmitted afterwards.

The relay STA MAC address field 440 includes identification information of a relay STA for receiving the relay request message 400. The destination STA MAC address field 450 includes identification information of a destination STA to which the relay STA will relay the data frame. The relay STA performs a DL setup procedure with the destination STA indicated by the destination STA MAC address field 450, and performs data frame relay based on the C-DLS proposed in the present invention.

Although a MAC address is exemplified in FIG. 4 as identification information of the relay STA and the destination STA, a variety of information capable of identifying STAs can be used as identification information, including an association identifier (AID). Further, a name of each field is arbitrarily named in the frame format of FIG. 4, and thus a part of the name may be omitted or a field including information indicating a frame length and including additional information required for C-DLS setup may be added.

Figure 5:
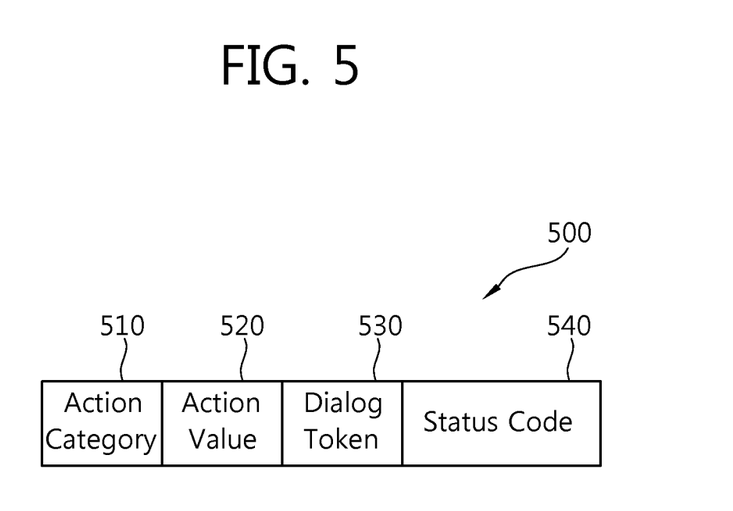
FIG. 5 is a diagram showing an exemplary format of a relay response message proposed in the present invention.

FIG. 5 is a diagram showing an exemplary format of a relay response message proposed in the present invention.

A relay response message 500 proposed in the present invention is a message transmitted by a relay STA to an AP in response to a relay request message, and may be used to report whether to accept the relay request. The relay response message 500 includes an action category field 510, an action value field 520, a dialog token field 530, and a status code field 540.

The action category field 510 and the action value field 520 indicate a category of a specific frame and a brief description on its operation. That is, these frames may indicate that the specific frame is related to data frame relay and is a control signal for responding to the request. The dialog token field may indicate identification information for mapping with a request message.

The status code field 540 indicates whether to accept a relay request. When a value of the status code field 540 indicates that the relay request is accepted, the AP may perform SDMA transmission to the relay STA and the destination STA.

Figure 6:
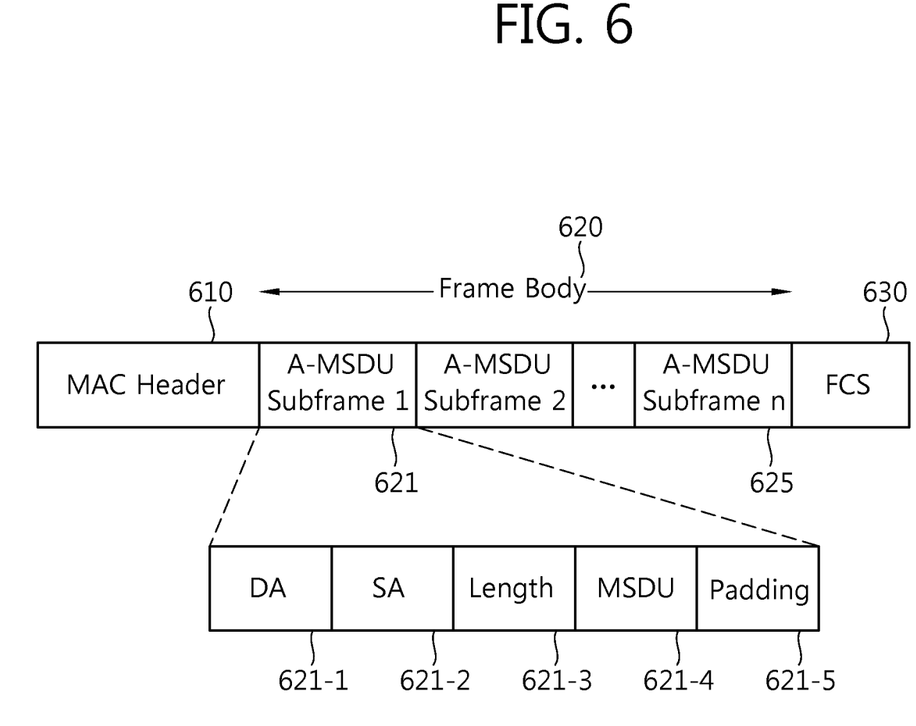
FIG. 6 is a diagram showing an example of A-MSDU that can be used in data frame transmission using C-DLS according to the present invention.

FIG. 6 is a diagram showing an example of A-MSDU that can be used in data frame transmission using C-DLS according to the present invention.

An IEEE 802.11-based data frame format includes a MAC header 610, a frame body 620, and an FCS 630.

The MAC header 610 may include a frame control field, four address fields, and a QoS control field. The frame control field has type and subtype information of a frame, and includes a 'To DS' bit, a 'From DS' bit, or the like to report a target indicated by values of the four address fields. Table 1 shows a detailed example of setting the To DS bit and the From DS bit.

TABLE 1

| To DS | From DS | Address 1 | Address 2 | Address 3 MSDU case | Address 3 A-MSDU case | Address 4 MSDU case | Address 4 A-MSDU case |
|---|---|---|---|---|---|---|---|
| 0 | 0 | RA = DA | TA = SA | BSSID | BSSID | N/A | N/A |
| 0 | 1 | RA = DA | TA = BSSID | SA | BSSID | N/A | N/A |
| 1 | 0 | RA = BSSID | TA = SA | DA | BSSID | N/A | N/A |
| 1 | 1 | RA | TA | DA | BSSID | SA | BSSID |

In frame transmission using the C-DLS proposed in the present invention, a format of the data frame transmitted by the AP to the relay STA may be an A-MSDU format. In this case, values of the To DS bit and the From DS bit of the frame control field of the MAC header 610 may be set to 1. This indicates that, among the four address fields included in the MAC header 610, a first address field, i.e., Address 1, indicates an address of a receiver STA (i.e., a receiver address (RA)), and a second address field, i.e., Address 2, indicates an address of a transmitter STA (i.e., a transmitter address (TA)), and third and fourth addresses indicate a BSSID. The QoS control field of the MAC header 610 may include an A-MSDU present field indicating that A-MSDU is present in the frame body 620.

The frame body 620 includes a plurality of A-MSDU subframes. An A-MSDU subframe-1 621 includes a DA field 621-1, an SA field 621-2, a length field 621-3, a MAC service data unit (MSDU) field 621-4, and a padding field 621-5.

The DA field 621-1 indicates an address of a destination STA, and the SA field 621-2 indicates an address of a source STA. The length field 621-3 indicates a length of the A-MSDU subframe-1 621. MSDU is a data to be transmitted to the destination STA. The padding field 625 is a bit added to make the A-MSUD subframe to a multiple of octet. A padding bit may be added to the A-MSDU subframes except for an A-MSDU subframe-n 625 which is the last A-MSDU.

The relay STA evaluates the DA field of the received A-MSDU subframe to determine whether it is a frame transmitted to the relay STA itself, and if the evaluation result shows that the field does not have the address of the relay STA, transmits the frame to an STA indicated by the DA.

According to the C-DLS method proposed in the present invention, if the destination STA receives a first frame through relay of the relay STA and the AP receives a second frame, there is a need to adjust a frame sequence. For this, sequence number information of the relayed first frame may be transmitted to the destination STA.

Figure 7:
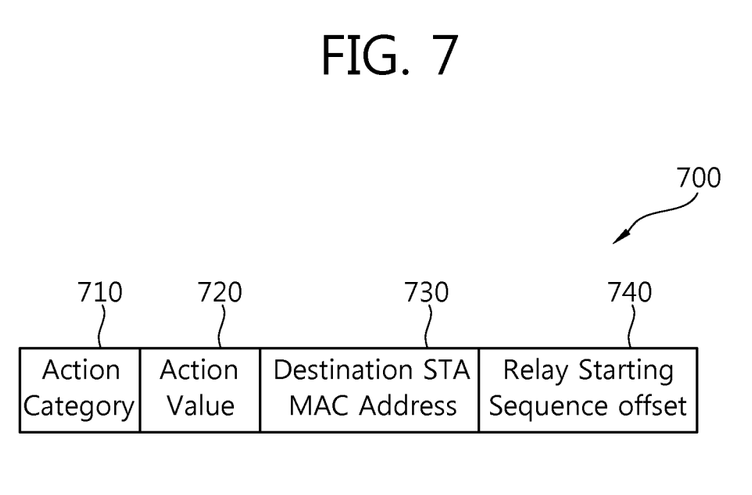
FIG. 7 is a diagram showing an exemplary format of a relay sequence control frame proposed in the present invention.

FIG. 7 is a diagram showing an exemplary format of a relay sequence control frame proposed in the present invention.

A relay sequence control frame 700 includes an action category field 710, an action value field 720, a destination STA MAC address field 730, and a relay starting sequence offset field 740.

The action category field 710 and the action value field 720 indicate a category of a specific frame and a brief description on its operation. That is, these frames may indicate that the specific frame is related to sequence information transmission and includes a sequence offset value.

The destination STA MAC address field 730 includes information indicating the destination STA. MAC address information of the destination STA may be used as information indicating the destination STA. The MAC address information is only exemplary information for indicating the destination STA, and thus any information such as an AID of the destination STA can be used as long as it can identify the destination STA.

The relay starting sequence offset field 740 includes sequence number information of a frame relayed via the relay STA. The relay starting sequence offset field may indicate sequence number information of a frame transmitted to the destination STA via the relay STA, or may indicate a difference value between a sequence number of a frame when the frame is transmitted by the AP and a sequence number when a specific frame is transmitted from the relay STA to the destination STA. In the latter case, a sequence of the sequence number of the specific frame may be determined with respect to a frame directly transmitted from the AP on the basis of a sequence number obtained by adding a sequence number of a frame transmitted from the relay STA to the difference value indicated by the relay starting sequence offset field 740.

For example, the AP transmits a frame corresponding to a sequence number 4 to the relay STA to transmit the frame to the destination STA. In this case, if a sequence number 2 is assumed when the frame is transmitted to the relay STA, the AP transmits the relay sequence control frame, in which the relay starting sequence offset field value is set to 2, to the relay STA. The relay STA receiving the frame can know that an original sequence number of the received frame is 4 which is obtained by adding the sequence number 2 of the received frame and the relay starting sequence offset field value of 2. Subsequently, if the sequence number is 0 when the relay STA transmits a specific frame to the destination STA, the relay STA transmits to the destination STA a relay sequence control frame in which the relay starting sequence offset field value is set to 4. The destination STA can know that an original sequence number of the received frame is 4 which is obtained by adding a sequence number 0 for the frame received from the relay STA and the relay starting sequence offset field value of 4. The destination STA regards the sequence number of the received frame as 4, and can determine a frame sequence by comparing the sequence number with a sequence number of a frame directly received from the AP.

Figure 8:
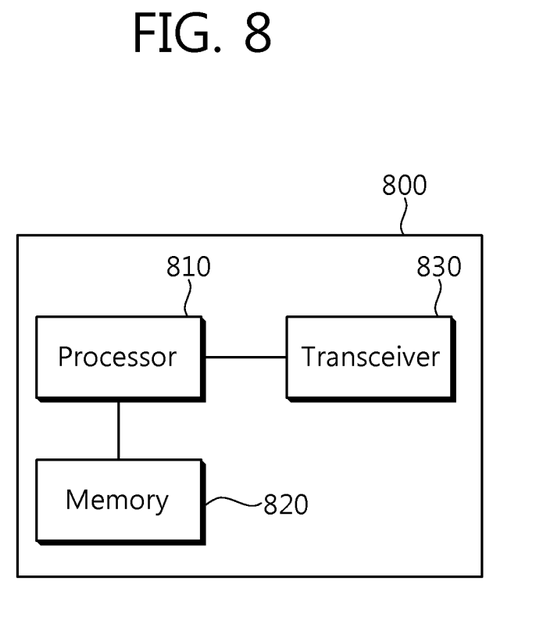
FIG. 8 is a block diagram showing a wireless apparatus supporting C-DLS proposed in the present invention.

FIG. 8 is a block diagram showing a wireless apparatus supporting C-DLS proposed in the present invention.

A wireless apparatus 800 may be an AP or a non-AP. The wireless apparatus 800 includes a processor 810, a memory 820, and a transceiver 830. The transceiver 830 transmits/receives a radio signal, and implements an IEEE 802.11 PHY layer. The transceiver 830 supports MU-MIMO transmission by using multiple antennas. The processor 810 is operationally coupled to the transceiver 803, and implements IEEE 802.11 MAC and PHY layers. When the processor 810 processes an operation of an AP in the aforementioned method, the wireless apparatus 800 is the AP. When the processor 810 processes an operation of an STA in the aforementioned method, the wireless apparatus 800 is the STA.

The wireless apparatus's MAC layer implemented by the processor 810 supports the aforementioned C-DLS setup and frame transmission method based on the C-DLS, generates a management frame necessary for the C-DLS setup, and transmits the generated management frame by the use of the transceiver 830 via a physical layer convergence protocol (PLCP) layer and a physical medium dependent (PMD) layer. The MAC and PHY layers supporting the transmission method based on the C-DLS of the present invention can be implemented by the processor by modularizing each layer.

The processor 810 and/or the transceiver 830 may include an application-specific integrated circuit (ASIC), a separate chipset, a logic circuit, a data processing unit, and/or a radio frequency (RE) unit for mutually converting a baseband signal and a radio signal. The memory 820 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 820 and may be performed by the processor 810. The memory 820 may be located inside or outside the processor 810, and may be coupled to the processor 810 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A method for receiving data in a wireless local area network, the method comprising:
   establishing, by a destination station, a direct link with a source station;
   establishing, by the destination station, a relay link with a relay station;
   receiving, by the destination station, a first physical layer protocol data unit (PPDU) from the source station via the direct link; and
   receiving, by the destination station, a second PPDU from the relay station via the relay link,
   wherein the second PPDU is received by the relay station from the source station and is forwarded by the relay station to the destination station,
   wherein the first PPDU includes a sequence field indicating that the second PPDU is to be transmitted via the relay link, and
   wherein the establishing the relay link with the relay station includes:
      receiving, by the destination station, a relay request message from the relay station to request a setup for the relay link, the relay request message including information about an association identifier (AID) of the relay station and an AID of the destination station; and
      transmitting, by the destination station, a relay response message to the relay station to indicate that the destination station is willing to participate in the relay link.

2. The method of claim 1, wherein the relay station receives the second PPDU from the source station during a first period and forwards the second PPDU to the destination station during a second period.

3. The method of claim 2, wherein the relay station does not exchange any PPDUs with the destination station during the first period and the relay station does not exchange any PPDUs with the source station during the second period.

4. A device configured for receiving data in a wireless local area network, the device comprising:
 a transceiver configured to transmit and receive radio signals; and
 a processor operatively coupled with the transceiver and configured to:
 establish a direct link with a source station;
 establish a relay link with a relay station;
 instruct the transceiver to receive a first physical layer protocol data unit (PPDU) from the source station via the direct link; and
 instruct the transceiver to receive a second PPDU from the relay station via the relay link,
 wherein the second PPDU is received by the relay station from the source station and is forwarded by the relay station to the device,
 wherein the first PPDU includes a sequence field indicating that the second PPDU is to be transmitted via the relay link, and
 wherein the processor establishes the relay link with the relay station by:
 instructing the transceiver to receive a relay request message from the relay station to request a setup for the relay link, the relay request message including information about an association identifier (AID) of the relay station and an AID of the destination station; and
 instructing the transceiver to transmit a relay response message to the relay station to indicate that the destination station is willing to participate in the relay link.

5. The device of claim 4, wherein the relay station receives the second PPDU from the source station during a first period and forwards the second PPDU to the device during a second period.

6. The device of claim 5, wherein the relay station does not exchange any PPDUs with the device during the first period and the relay station does not exchange any PPDUs with the source station during the second period.

* * * * *